(12) United States Patent
Haley

(10) Patent No.: US 7,618,029 B2
(45) Date of Patent: Nov. 17, 2009

(54) WIRE CLAMPING DEVICE

(75) Inventor: Ronald Joseph Haley, Havre, MT (US)

(73) Assignee: Lisle Corporation, Clarinda, IA (US)

( * ) Notice: Subject to any disclaimer, the term of this patent is extended or adjusted under 35 U.S.C. 154(b) by 19 days.

(21) Appl. No.: 11/972,032

(22) Filed: Jan. 10, 2008

(65) Prior Publication Data

US 2009/0179364 A1 Jul. 16, 2009

(51) Int. Cl.
*B25B 11/00* (2006.01)
(52) U.S. Cl. .................. 269/8; 269/3; 269/6; 269/45
(58) Field of Classification Search ............. 269/43, 269/45, 8, 71, 95, 6, 3; 403/DIG. 1; 248/309.4, 248/206.5, 537, 467, 683
See application file for complete search history.

(56) References Cited

U.S. PATENT DOCUMENTS

| | | | | |
|---|---|---|---|---|
| 3,109,619 | A * | 11/1963 | Krug et al. | 248/206.5 |
| 3,689,687 | A * | 9/1972 | Bosch | 248/206.5 |
| 3,883,128 | A * | 5/1975 | Breese | 269/45 |
| 4,070,011 | A * | 1/1978 | Glesser | 269/45 |
| 6,145,823 | A | 11/2000 | Moushon et al. | |
| 6,279,885 | B1 * | 8/2001 | Leon, Jr. | 269/8 |
| 6,352,229 | B1 * | 3/2002 | Adams | 248/316.7 |

OTHER PUBLICATIONS

Invention Disclosure Agreement dated Aug. 22, 1991 by Ronald Osterland for a soldering tool.
Invention Disclosure Agreement dated Feb. 2, 1993 by Jesse Dowdy for a tool to hold wires together while soldering them.
Invention Disclosure Agreement dated Jul. 19, 1993 by John Williams for a fixture for holding wires together while soldering them.
Invention Disclosure Agreement dated Dec. 29, 1993 by Carl F. Barnes for a soldering and brazing clamp.
Invention Disclosure Agreement dated Sep. 16, 1994, No. 94-577, by Perry M. Carder for wire clamps for electrical wire repair.
Invention Disclosure Agreement dated Nov. 26, 1994, No. 94-726, by David Harnishfeger for a fixture to hold wires while soldering.
Invention Disclosure Agreement dated Jul. 14, 1995, No. 95-537, by Michael Artemis for electrical wire forceps.
Invention Disclosure Agreement received Oct. 17, 1997, No. 97-532, by Chris Verhougstraete for a locking plier with two jaws.
Invention Disclosure Agreement dated Jul. 27, 1998, No. 98-367 by John R. Watkins for a solder mate tool.
Invention Disclosure Agreement dated Apr. 6, 2000, No. 00-146, by Bob Payne for the solder helper tool.
Invention Disclosure Agreement dated Sep. 18, 2000, No. 00-409, by Jim Pressley for a solder helper tool.

(Continued)

*Primary Examiner*—Lee D Wilson
(74) *Attorney, Agent, or Firm*—Banner & Witcoff, Ltd

(57) ABSTRACT

A wire clamp holder includes a magnetized central post or support body mount having left hand and right hand clamp arms or clip holders magnetically attached thereto and rotatable with respect thereto to permit maximum adjustability for positioning of lead wires held by wire clamping jaws associated with the clamp arms.

5 Claims, 3 Drawing Sheets

OTHER PUBLICATIONS

Invention Disclosure Agreement dated Jun. 11, 2001, No. 01-210, by Nylan G. Ficken for a wire holder.

Invention Disclosure Agreement dated Aug. 4, 2002, No. 02-331, by Rick Wilson for clips to hold wires together while soldering them.

Invention Disclosure Agreement dated Jan. 6, 2004, No. 04-205, by Randy R. Petersen for a tool to hold wires together for soldering them.

Idea Disclosure Agreement dated Nov. 29, 2005, No. 05-508, by Anthony Jeffries for a solder buddie.

Idea Disclosure Agreement dated May 18, 2006, No. 06-326, by Billy C. McDonald, Jr. for a wiring tool.

Idea Disclosure Agreement dated Apr. 23, 2007, No. 07-239, by Ronald Haley for a wire holder for soldering.

McMaster-Carr, p. 2506, "Multiposition Clamping System" and "Mini Spring Clamp Systems".

McMaster-Carr, p. 2485, "Any-Angle Spring Clip Workholder" and "Any-Angle Miniature Workholders".

www.musicmedic.com, Oct. 16, 2007, "Soldering Clamp".

www.lenscleaner.com, Oct. 16, 2007, "Soldering Clamp-Straight".

* cited by examiner

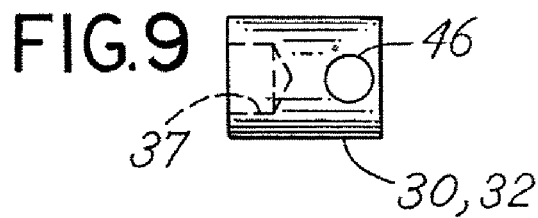
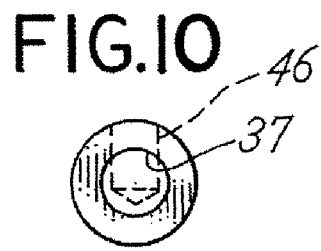
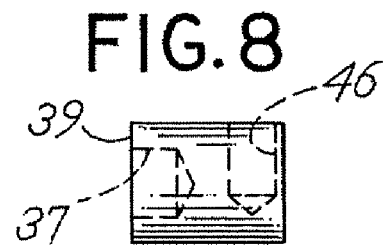
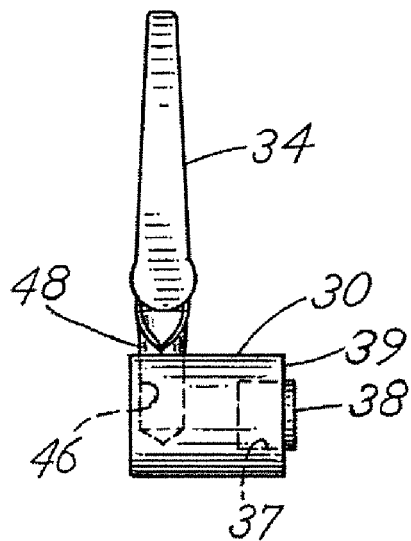
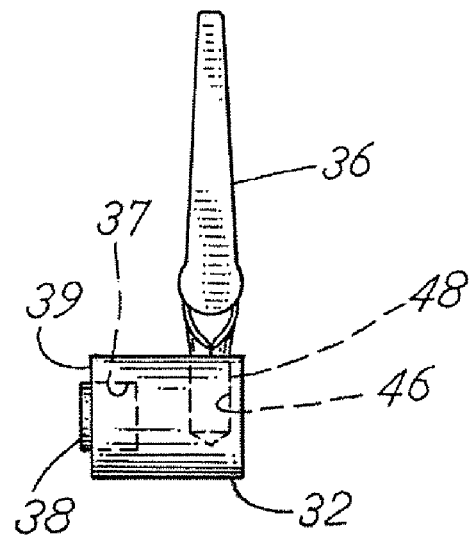

WIRE CLAMPING DEVICE

BACKGROUND OF THE INVENTION

In a principal aspect the present invention relates to a wire clamping device and, more particularly, to a device to engage the lead ends of separate wires and hold them in a position for joining or soldering the ends together.

Often in automobile repair as well as repair of other wired products it is appropriate and necessary to connect wires by a soldering operation or alternatively to otherwise join the wires together. When repairing an automobile, holding the wires in position, particularly in the engine compartment or in some other restricted space is often a difficult task. This is particularly so when one is attempting to solder the wire ends together. Thus, there has developed the need to provide some type of mechanism to enable the leads of wires that are to be soldered to be joined or held relative to one another in a position that will facilitate soldering.

There are numerous devices available which comprise clamping systems for holding wires and other purposes. Spring clamps, for example, are mounted on platforms such as depicted in the McMaster Car Catalogue. Multi-position clamping systems, Mini-spring clamping systems, and Angle spring clip work holders. Other products available in the work place comprise soldering clamps or soldering holders such as found at www.musicmedic.com and at www.lenscleaner.com, defined respectively as a soldering clamp and as a soldering clamp-straight.

U.S. Pat. No. 6,145,823 entitled Solder Clamp, issued Nov. 14, 2000 discloses yet another device which is designed to hold lead wires in an appropriate position so that they may be soldered.

While the noted products have utility, greater flexibility with respect to such devices is deemed an appropriate goal. Moreover, a device which is usable in a restrictive space such as a vehicle engine compartment is also a desirable goal.

SUMMARY OF THE INVENTION

Briefly, the present invention comprises a wire clamping device for positioning first and second wire ends or wire leads relative to each other. The device includes a central body mount which has a base with a magnet. A support arm extends from the base. First and second laterally spaced magnetic platforms are incorporated on opposite sides of the support arm and are spaced from or positioned above the base portion. A first clamp arm with a magnet is cooperatively mounted on one of the platforms of the central body mount. A second clamp arm with a magnet is mounted on the other platform. Clamps or clips, such as alligator clips, are incorporated on each of the clamp arms. Each clamp arm is rotatable or movable about the surface of the associated platform so that each arm may be appropriately oriented to position a lead wire held in a clip mounted on the arm. Thus, each of the clamp arms is independently movable or rotatable and the base itself is positionable in a desired position on a magnetic surface, such as the inside of an engine compartment which is typically a steel surface. As a consequence, the wire clamp device of the invention may be fabricated in a very compact fashion, yet the device enables positioning of lead wires and gripping of lead wires in cramped spaces in a highly efficient manner so that the lead wires may be soldered together.

Thus it is an object of the invention to provide an improved wire clamping device.

A further object of the invention is to provide a wire clamping device which includes wire clamping arms that are independently movable with respect to one another and further, which are attached or affixed to a body mount by magnet means.

A further object of the invention is to provide a wire clamp device which utilizes a body mount that includes a magnet so that the body mount and the attached wire clamping arms associated therewith may be positioned and maintained in a position, for example, within the engine compartment of a motor vehicle.

Another object of the invention is to provide a wire clamp device which is easily manipulated, rugged, inexpensive and easy to use.

These and other objects, advantages and features of the invention will be set forth in the detailed description which follows

BRIEF DESCRIPTION OF THE DRAWING

In the detailed description which follows, reference will be made to the drawing comprised of the following figures:

FIG. 8 is a side elevation of the clamp arm or clip holder of the embodiment of the Figures;

FIG. 9 is a top plan view of the clamp arm of FIG. 8;

FIG. 10 is a left hand side view of the clamp arm of FIG. 8;

FIG. 11 is a top plan view of the clip holder assembly positioned on the left side of the embodiment of FIG. 1; and FIG. 12 is a top plan view of the right hand side of the clip holder assembly as depicted in FIG. 1.

DESCRIPTION OF EMBODIMENTS OF THE INVENTION

Figure 1:
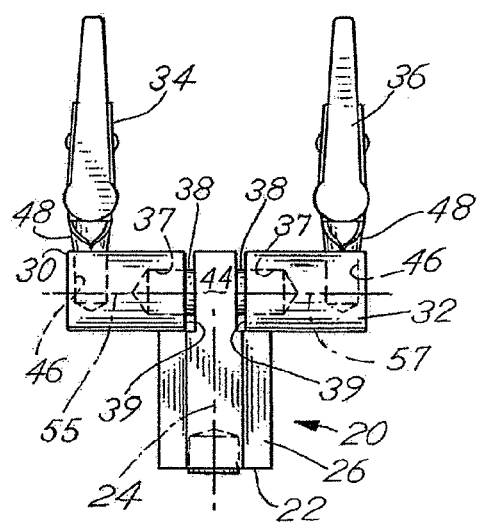
FIG. 1 is a top plan view of an embodiment of the invention comprising a support arm or post of a body mount with a magnet base and having clamp arms or clip holders attached thereto.

Referring to the figures, the wire clamp device of the invention comprises a body mount 20, having a bottom face or base surface 22 with a longitudinal axis 24 extending upwardly, and a support arm or post 26 extending upwardly from the base 22 in the axial direction. The wire clamp device further includes a left hand clamp arm assembly 30 and a right hand clamp arm assembly 32. A wire clamp or clip 34 is attached to the first or left hand clamp arm assembly 30. A wire clip arm or clamp 36 is attached to the second or right hand clip arm 32.

The clip arms or assemblies 30, 32 are substantially identical. Each clip arm 30 and 32 includes a recess 37 with a magnet 38 mounted therein. The magnet 38 extends beyond or projects from an inside edge 39 of each of the clip arms 30 and 32. The magnets 38 have a planar, exposed face. Each of the magnets 38 is retained within their respective openings 37 by means of an epoxy by way of example. The magnets 38 that are preferred in the embodiment comprise a noble metal magnet. Each arm 30, 32 also includes a counterbore 46. The counterbore 46 defines a receptacle to receive the post end 48 of a clip 34, 36, such as an alligator clip. Arms 30, 32 are generally coaxial and extend in opposite directions from mount 20 normal to axis 24.

The body mount 20 includes a generally rectangular post extension 44 having planar surfaces 56 and 58 on opposite sides thereof which cooperate respectively with the magnets 38 associated with the right clip arm or holder 32 and the left clip arm or holder 30.

Figure 2:
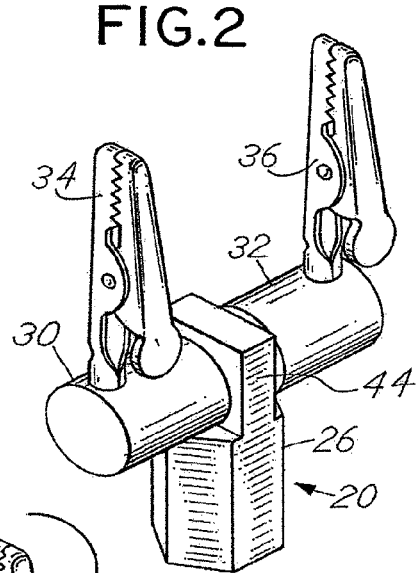
FIG. 2 is an isometric view of the embodiment of FIG. 1.
Figure 3:
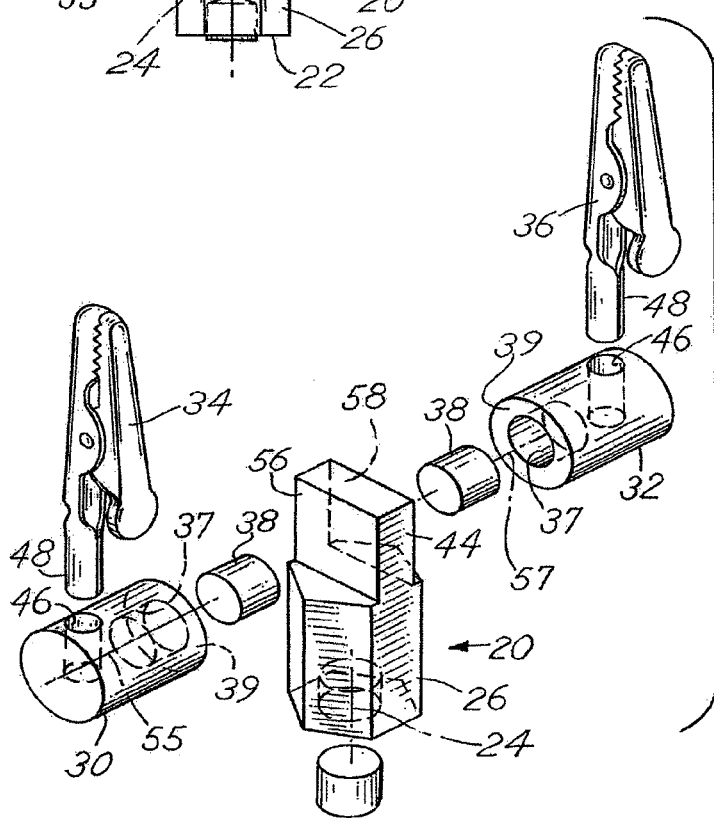
FIG. 3 is an exploded isometric view of the wire clamp of FIG. 1.
Figure 4:
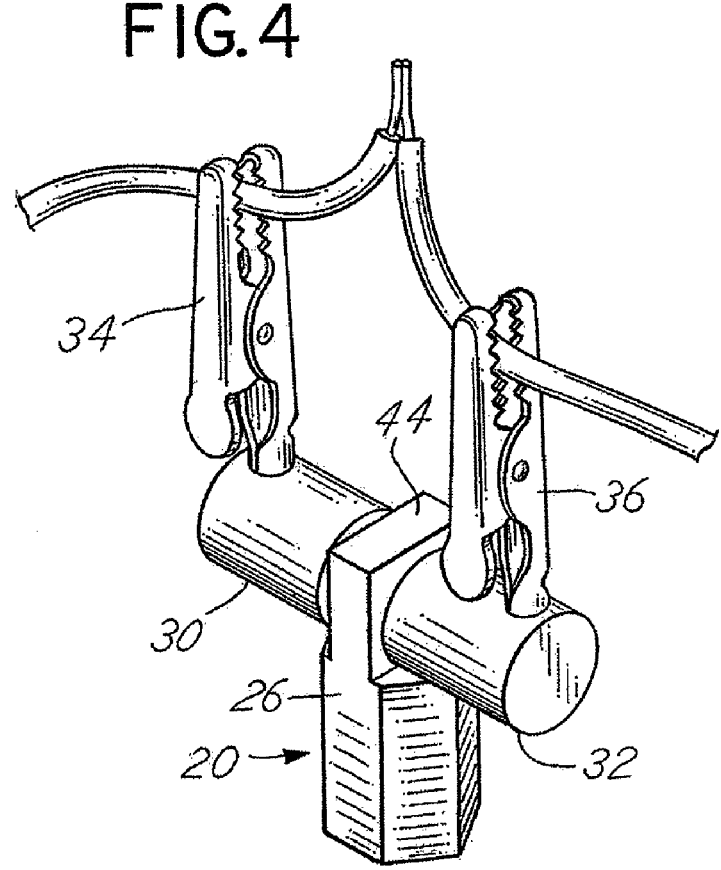
FIG. 4 is an isometric view illustrating the manner of use of the wire clamp in FIGS. 1-3.
Figure 6:
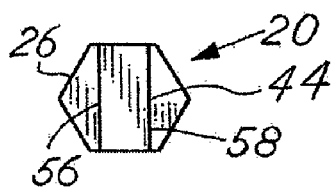
FIG. 6 is a top plan view of the mount of FIG. 5.
Figure 5:
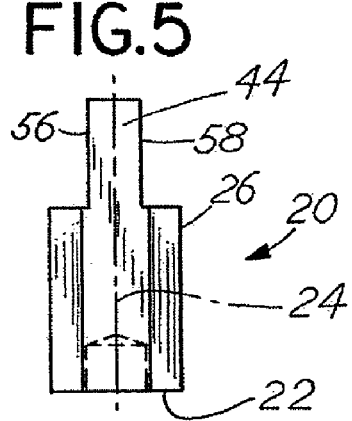
FIG. 5 is an elevation of the body mount of the wire clamp device of the invention.
Figure 7:
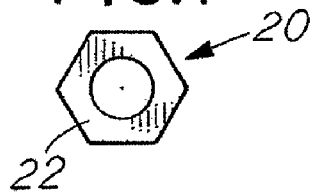
FIG. 7 is a bottom plan view of the mount of FIG. 5.

The entire assembly is shown in the isometric views of FIGS. 2 and 3 and the manner of use is illustrated in FIG. 4. Each of the clips 34, 36 will engage and retain a separate wire and hold the wire lead in a desired position so that two wires may be soldered together. It is to be noted that the clip arms 30 and 32 are rotatable about their respective axes, such as the axes 55 and 57 respectively. It is also noted that the axes 55 and 57 may be co-axial and are transverse or normal to the axis 24. Further, the planar walls or faces of the post 44, namely the surfaces 56 and 58 are generally parallel to the axis 24. However, the surfaces 56 and 58 may be angled with respect thereto and the axes 55, 57 may be non-coaxial relative to one another. The maneuverability of the arms 30, 32 about the post 44 is a feature of the invention which is not necessarily dependent upon the planar relationship of the surfaces 56, 58.

While there has been set forth a preferred embodiment of the invention, it is to be understood that the invention is limited only by the following claims and improvements thereof. For example, as mentioned, the angular relationship between the magnets 38 and the associated platforms 56 and 58 may be altered or adjusted. The preservation of the multiple degrees of rotation and freedom of movement of the composite elements comprising wire holder enables the use of the holder in a cramped or tight space and permits maximum adjustability.

What is claimed is:

1. A wire clamping device for positioning first and second wire leads relative to each other comprising, in combination:

a central body mount including a base portion having a generally flat, planar base bottom surface and having a body axis extending generally perpendicular to the bottom surface, said body mount further including a support post extending from the base portion, said support post including first and second magnetic platforms on the support post spaced from the base portion bottom surface, said base portion including a magnet at the base surface;

said first and second platforms comprising generally flat, parallel surfaces located generally on opposite sides of the body axis;

a first clamp arm including a first wire clamping jaw, said first clamp arm mounted on a first holder, said first holder including a magnetic element positionable on the first platform of the body mount, said first holder comprising an element separate and detachable from the body mount and rotatable about a first holder axis transverse to the first platform, said first wire clamping jaw extending generally radially from the first holder; and a second clamp arm including a second wire clamping jaw, said second clamp arm mounted on a second holder, said second holder including a magnetic element positionable on the second platform of the body mount, said second holder comprising an element separate and detachable from the body mount and rotatable about a second holder axis transverse to the second platform, said second wire clamping jaw extending radially from the second holder, said first and second wire clamp arms extending in generally opposite directions and adjustably positionable both rotationally and linearly solely by magnetic attraction on the first and second platforms respectively to orient said first and second wire clamping jaws with respect to each other wherein a lead in each jaw may be juxtaposed and oriented for connection.

2. The device of claim 1 wherein at least one clamping jaw comprises an alligator clamp.

3. The device of claim 1 wherein the first and second platforms are equally spaced from the body axis.

4. The device of claim 1 wherein the first and second arms each include a magnet with a generally flat planar face, said magnets each recessed in a counterbore in the respective arms, said first and second arms rotatable about the respective first and second holder axis.

5. The device of claim 3 wherein the first and second arms each include a magnet with a generally flat planar face compatible respectively with the first and second platforms.

* * * * *